United States Patent
Samuel

(10) Patent No.: US 12,523,137 B2
(45) Date of Patent: Jan. 13, 2026

(54) BOREHOLE OPERATION SYSTEM WITH AUTOMATED MODEL CALIBRATION

(71) Applicant: Landmark Graphics Corporation, Houston, TX (US)

(72) Inventor: Robello Samuel, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 18/151,884

(22) Filed: Jan. 9, 2023

(65) Prior Publication Data

US 2024/0229632 A1 Jul. 11, 2024

(51) Int. Cl.
*E21B 44/00* (2006.01)

(52) U.S. Cl.
CPC .......... *E21B 44/00* (2013.01); *E21B 2200/20* (2020.05)

(58) Field of Classification Search
CPC .............................. E21B 44/00; E21B 2200/20
See application file for complete search history.

(56) References Cited

U.S. PATENT DOCUMENTS

| | | |
|---|---|---|
| 7,296,054 B2 | 11/2007 | Menter et al. |
| 7,660,673 B2 | 2/2010 | Dozier |
| 10,664,559 B2 | 5/2020 | Feldmann et al. |
| 11,061,318 B2 | 7/2021 | Lo et al. |
| 11,391,144 B2 | 7/2022 | Samuel |
| 2007/0032896 A1 | 2/2007 | Ye et al. |
| 2014/0214326 A1 | 7/2014 | Samuel |
| 2014/0326449 A1 | 11/2014 | Samuel et al. |
| 2016/0281490 A1* | 9/2016 | Samuel .................. G05B 17/02 |
| 2020/0149386 A1* | 5/2020 | Menand ................ E21B 47/022 |
| 2020/0157887 A1* | 5/2020 | Alonso ................... E21B 43/30 |
| 2020/0190957 A1 | 6/2020 | Madasu et al. |
| 2020/0302293 A1* | 9/2020 | Liu ........................ G06Q 50/02 |
| 2020/0362686 A1* | 11/2020 | Puwanto ................. E21B 21/10 |
| 2022/0188712 A1 | 6/2022 | Mittal et al. |

FOREIGN PATENT DOCUMENTS

WO 2018140322 A1 8/2018

OTHER PUBLICATIONS

International Search Report and Written Opinion dated Sep. 20, 2023 for PCT Patent Application No. PCT/US2023/060331 filed on Jan. 9, 2023.

* cited by examiner

*Primary Examiner* — Nicole Coy
*Assistant Examiner* — Nicholas D Wlodarski
(74) *Attorney, Agent, or Firm* — K&L Gates LLP

(57) ABSTRACT

A system for drilling a borehole at a wellsite, the system including a BHA with a drill bit and operable to drill the borehole as part of a borehole drilling operation using a modeled operational parameter. The system also includes a sensor located in the borehole and operable to measure an actual operational parameter in real-time. A controller including a processor performs operations that include: determining a modeled result for the borehole drilling operation using a well engineering model; receiving the measurement of the actual operational parameter from the sensor; determining an actual result for the borehole drilling operation using the well engineering model; automatically calibrating the well engineering model using the modeled result and the actual result to produce a calibrated well engineering model; and adjusting the modeled operational parameter of the drilling operation based on the calibrated well engineering model.

18 Claims, 3 Drawing Sheets

BOREHOLE OPERATION SYSTEM WITH AUTOMATED MODEL CALIBRATION

BACKGROUND

A hydrocarbon well can include a wellbore drilled through a subterranean formation. A drilling operation to form the wellbore can involve various drilling parameters, such as weight on bit, revolutions per minute, rate of penetration, etc. Using the various drilling parameters, drilling equipment can be controlled to penetrate the subterranean formation and access a reservoir. The reservoir can include hydrocarbon fluid that can be extracted subsequent to the wellbore being drilled and completed.

During the drilling operation, the drilling parameters may be controlled or managed to ensure that drilling objectives are achieved. For example, a computing device can be used to monitor the drilling operation and control parameters for the drilling operation based on a model. Although the drilling parameters may be optimized to achieve a particular drilling objective, optimizing drilling parameters may involve significant data processing time and resources and may not account for real time changes occurring with respect to the drilling operation.

Traditionally, the parameters used in the model are calibrated using manual methods which will involve time consuming iterative process. However, manual calibration may be subjective due to biases and thus not accurately reflect a properly calibrated model.

BRIEF DESCRIPTION OF THE DRAWINGS

Embodiments of a borehole operation system with automated model calibration are described with reference to the following figures. The same or sequentially similar numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
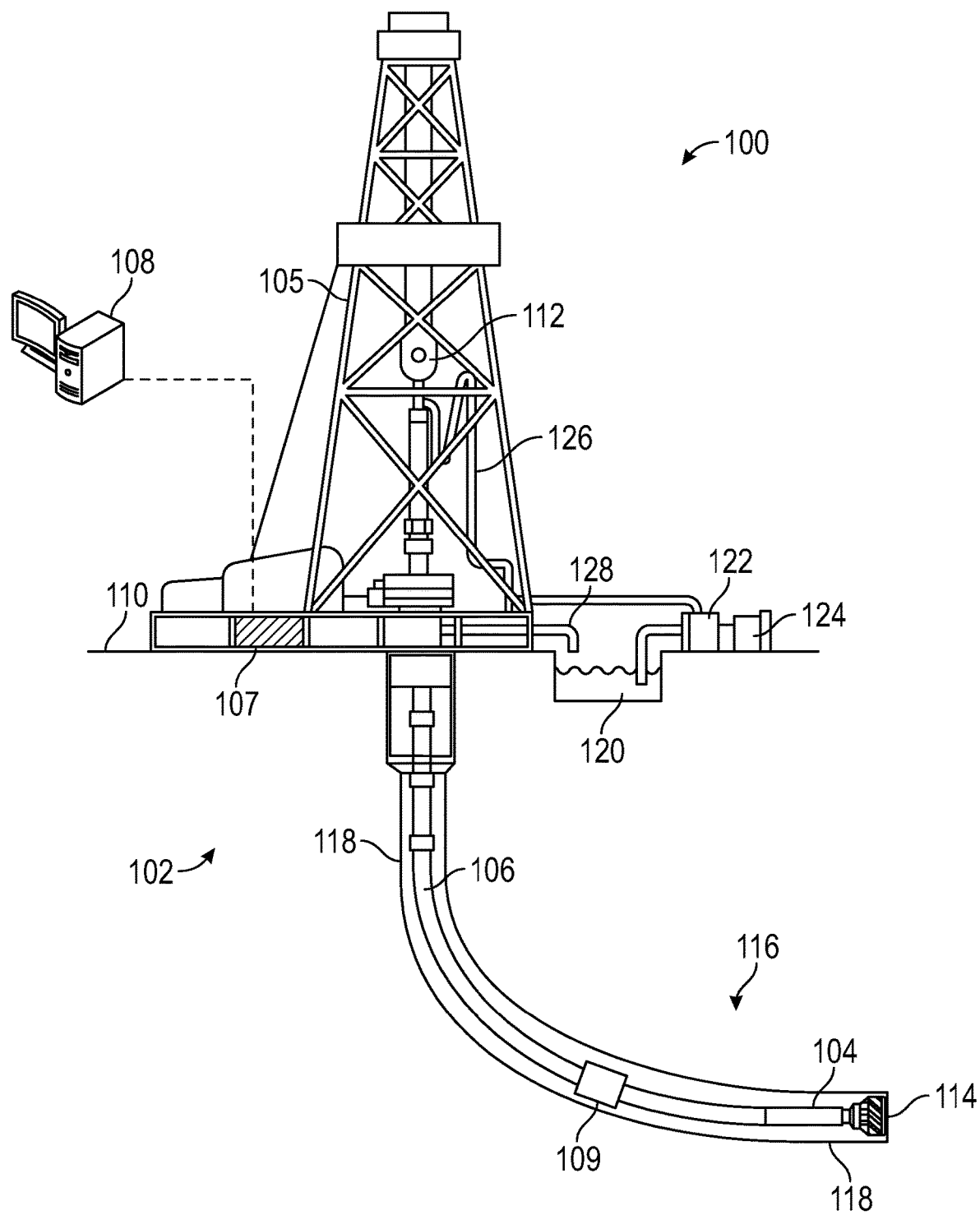
FIG. 1 is a cross-sectional view of a wellbore formed with wellbore operation system according to one or more embodiments.

When developing a borehole, one or more types of borehole operations can be conducted, such as drilling, tripping in, tripping out, and other borehole operations that are performed at least partially within the borehole. Borehole operations can be affected by operational parameters such as friction, accumulation of material in the borehole, the presence of cuttings, cuttings bed, and other operational parameters. For example, a drilling fluid can accumulate cuttings and thereby increase the friction force against a rotating drill pipe, or the drill pipe can experience friction against a casing or subterranean formation, such as in a bend or dogleg portion of the borehole.

To perform borehole operations, operational parameters can be used with well engineering models to predict and control the operations so that an objective function, e.g., ROP, cost, etc., can be satisfied. Modeled operational parameters are used in one or more of the well engineering models to predict or model a modeled result. The operational parameters can be determined based on factors such as whether a drilling objective is satisfied using the modeled result, information about the equipment being used to drill the borehole. Once modeled operational parameters are determined, the borehole operation is commenced and sensors measure real-time data about the actual operational parameters during the borehole operation being performed. To improve the borehole operation system overall, an actual result is determined by inputting the measured actual operational parameters into the well engineering model. The modeled result is compared to the actual result and the well engineering model is automatically calibrated based on the comparison to produce a calibrated well engineering model. The modeled operational parameters can then be adjusted based on using the calibrated well engineering model to produce a modeled result that satisfies the objective function.

During borehole operations, data regarding the actual operational parameters can be collected from sensors downhole or at a surface location, where the data can be analyzed by one or more borehole operation systems. The operation systems for receiving the collected data and performing an analyzation of the data can be individual or monolithic systems, for example, a software product or a hardware product combined together into one accessible platform. These borehole operation systems can be deployed, for example, on site at the borehole. Determining optimal values for the operational parameters to use for the borehole operation may involve time-intensive analysis and data processing. Therefore, it would be beneficial to be able to access one or more modules of the borehole operation systems quickly, such as in real-time or near real-time, and with less processing overhead to enable faster output of results from the given inputs.

This disclosure presents processes and methods to improve the analysis of operational parameters of a wellbore operation and increase the accuracy of estimations of operational parameters, such as utilizing faster and more accurate autocalibration algorithms for well engineering models. Autocalibration uses large amounts of data sets without individual biases that can creep into the process. Some of the methods used in automated calibration are optimization techniques based genetic or swarming algorithms, machine learning, deep learning methods, and Bayesian methods. Bayesian methods have a unique advantage when the model inputs have high sensitivity and high uncertainty with limited amount of data.

Turning now the figures, FIG. 1 is a cross-sectional view of a wellbore system 100 that can be used to perform borehole operations. The borehole system 100 can be a drilling system, a logging while drilling (LWD) system, a measuring while drilling (MWD) system, a seismic while drilling (SWD) system, a telemetry while drilling (TWD) system, and other hydrocarbon well systems, such as a relief well or an intercept well. In one or more embodiments, borehole system 100 can be for scientific or research purposes.

For purposes of this disclosure, the wellbore system 100 will be described in an example of a drilling system. In the example, the wellbore system 100 may be used to form a borehole 118 with drilling equipment according to at least one embodiment of the present disclosure. A borehole 118 used to extract hydrocarbons may be created by drilling into a subterranean formation 102 using the wellbore system 100. The wellbore system 100 may drive a drillstring 116 that includes a bottom hole assembly (BHA) 104 positioned or otherwise arranged at the bottom of a drill pipe 106 extended into the subterranean formation 102 from a derrick 105 arranged at the surface 110. The derrick 105 includes a kelly 112 used to lower and raise the drillstring 116. The BHA 104 is operatively coupled to a drill bit 114, which may be moved axially within the drilled borehole 118 to extend the borehole 118. Although not shown, the drillstring 116 may include a steering system to steer the direction of the borehole 118, such as a rotary steerable system. The drillstring 116 may include one or more sensors 109, for determining conditions in the wellbore. The sensors 109 may be positioned anywhere along the drillstring 116, including on drilling equipment, and sense values of drilling parameters for a drilling operation. Although shown as separate, the sensors 109 may be located on or be a part of the BHA 104. The sensors 109 can send signals to the surface 110 via a wired or wireless connection, and the sensors 109 may send real-time data relating to the drilling operation to the surface 110. The combination of any support structure (in this example, the derrick 105), any motors, electrical equipment, and support for the drillstring 116 and the drill pipe 106 may be referred to herein as a drilling arrangement.

During operation, the drill bit 114 penetrates the subterranean formation 102 to create the borehole 118. The BHA 104 can provide control of the drill bit 114 as the drill bit 114 advances into the subterranean formation 102. The combination of the BHA 104 and drill bit 114 can be referred to as a drilling tool. Fluid or "mud" from a mud tank 120 may be pumped downhole using a mud pump 122 powered by an adjacent power source, such as a prime mover or motor 124. The mud may be pumped from the mud tank 120, through a stand pipe 126, which feeds the mud into the drillstring 116 and conveys the same to the drill bit 114. The mud exits one or more nozzles (not shown) arranged in the drill bit 114 and in the process cools the drill bit 114. After exiting the drill bit 114, the mud circulates back to the surface 110 via the annulus defined between the borehole 118 and the drillstring 116, and hole cleaning can occur which involves returning the drill cuttings and debris to the surface. The cuttings and mud mixture are passed through a flow line 128 and are processed such that a cleaned mud is returned down hole through the stand pipe 126 once again.

The drilling arrangement and any sensors 109 and the BHA 104 (through the drilling arrangement or directly) are connected to a wellsite controller 107 and a computing device 108. As discussed in more detail below, the wellsite controller 107 and the computing device 108 include a processor and a memory and is configured to direct operation of borehole system 100. Although one wellsite controller 107 is depicted in FIG. 1, in other examples, more than one controller can be used, and together, the multiple controllers can perform operations, such as those described in the present disclosure.

In FIG. 1, the wellsite controller 107 is illustrated as being installed with the drilling arrangement. However, a computing device to receive data from sensors and to control the drill bit 114 can be installed on a service vehicle or in an operation control center separate from the drilling arrangement. The wellsite controller 107 can be hand-held and can be locally or remotely located. The wellsite controller 107 can be positioned belowground or aboveground. The wellsite controller 107 can include a processor interfaced with other hardware via a bus. A memory, which can include any suitable tangible (and non-transitory) computer-readable medium, such as random-access memory ("RAM"), read-only memory ("ROM"), electrically erasable and programmable read-only memory ("EEPROM"), or the like, can embody program components that configure operation of the wellsite controller 107. In one or more embodiments, the wellsite controller 107 can include input/output interface components (e.g., a display, printer, keyboard, touch-sensitive surface, and mouse) and additional storage.

Figure 2:
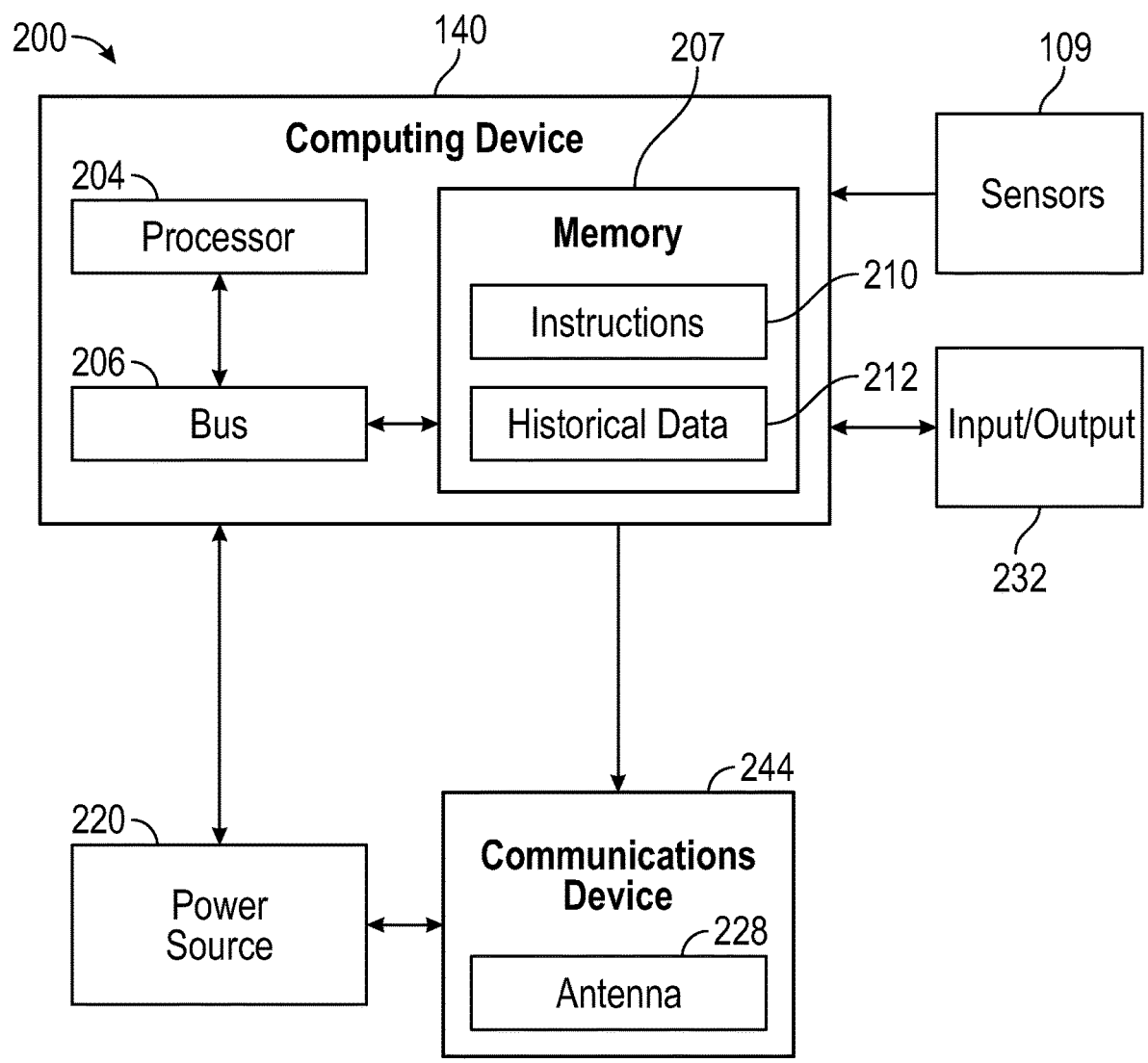
FIG. 2 is a block diagram of a computing system for automatically controlling the wellbore operation system in a wellbore operation according to one or more embodiments.

The wellsite controller 107 can include a communication device (shown in FIG. 2). The communication device can represent one or more of any components that facilitate a network connection, such as with the computing device 108. In the example shown in FIG. 1, the communication devices are wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In some examples, the communication devices can use acoustic waves, surface waves, vibrations, optical waves, or induction (e.g., magnetic induction) for engaging in wireless communications. In other examples, the communication device can be wired and can include interfaces such as Ethernet, USB, IEEE 1394, or a fiber optic interface. In an example with at least one other computing device, the wellsite controller 107 can receive wired or wireless communications from the other computing device and perform one or more tasks based on the communications.

The computing device 108 can be proximate wellsite controller 107 or be a distance away, such as in a cloud environment, a data center, a lab, or a corporate office location. Computing device 108 can be a laptop, a smartphone, a PDA, a server, a desktop computer, a cloud computing system, an edge computing system, other computing systems, or a combination thereof, that are operable to perform the processes and methods described herein. Wellsite operators, engineers, and other personnel can send and receive data, instructions, measurements, and other information by various conventional means with computing device 108 or wellsite controller 107. Further, the computing device 108 can be more than one computing system, such as a cloud environment and a local server, a downhole tool and a wellsite controller, or other combinations thereof.

The wellsite controller 107 or the computing device 108 which can be communicatively coupled to wellsite controller 107, can be utilized to communicate with downhole sensors 109 and the BHA 104, such as sending and receiving telemetry, data, instructions, and other information, including but not limited to, borehole data, the distance interval between calculations, weighting parameters, location within the borehole, a cuttings density, a cuttings load, a cuttings shape, a cuttings size, a deviation, a drill pipe rotation rate, a drill pipe size, a flow regime, a hole size, a mud density, a mud rheology, a mud velocity, a pipe eccentricity, subterranean formation mineralogy, and other input parameters.

The wellbore-wellbore system 100 can be automatically controlled by the wellsite controller 107 alone, or in combination with the computing device 108, using an objective function generated using operational parameters of equipment used in the drilling operation. As discussed further below, the objective function can define values for drilling parameters within constraints, and the operational parameters can be used to control the drilling operation to achieve drilling objectives satisfactorily. The operational parameters can be automatically input into drilling equipment by the wellsite controller 107 for controlling the drilling operation. In other examples, an operator of the wellbore-wellbore system 100 can manually input drilling parameters into drilling equipment for controlling the drilling operation.

One or more micro-service processors can be part of the wellsite controller 107 or computing device 108. The micro-service processors can be partially located with the wellsite controller 107, the computing device 108, more than one computing device 108, or various combinations thereof. The micro-services performed by the micro-service processors can be encapsulated in software code or in hardware, for example, an application, code library, dynamic link library, module, function, script, RAM, ROM, and other software and hardware implementations. The software can be stored in a file, database, or other computing system storage mechanism. In one or more embodiments, the micro-services can be partially implemented in software and partially in hardware.

The one or more micro-service processors can receive the various operational parameters, such as from real-time or near real-time data received from sensors downhole or at a surface location, and perform the methods and processes disclosed herein, such as performing an autocalibration of a well engineering model or optimization workflow. The results from the micro-services can be communicated to an optimizer, an operation parameter processor, a drilling operations system, a drilling steering system, or other wellsite system or user where the results can be used as inputs to direct further borehole operations or can be used to identify adjustments to a borehole operation plan. Alternatively, the computing device 108 can be located with downhole tools 120 and the computations can be completed at the downhole location. The results can be communicated to a drilling system or to a drilling operation system downhole or at a surface location.

FIG. 1 depicts an onshore operation. Those skilled in the art will understand that the disclosure is equally well suited for use in offshore operations. FIG. 1 depicts a specific borehole configuration, those skilled in the art will understand that the disclosure is equally well suited for use in boreholes having other orientations including vertical boreholes, horizontal boreholes, slanted boreholes, multilateral boreholes, and other borehole types.

FIG. 2 is a block diagram of a computing system 200 for automatically controlling a drilling operation according to one example of the present disclosure. In some examples, the components shown in FIG. 2 (e.g., the wellsite controller 107 or the computing device 108, power source 220, and communications device 244) can be integrated into a single structure. For example, the components can be within a single housing. In other examples, the components shown in FIG. 2 can be distributed via separate housings or otherwise, and in electrical communication with each other.

The system 200 includes the wellsite controller 107 and/or the computing device 108 alone or in combination. The system 200 can also be implemented in one or more computing systems, for example, the wellsite controller 107, the drilling system, the BHA 109, a downhole tool, a data center, a cloud environment, a server, a laptop, a smartphone, a tablet, other computing systems, and various combinations thereof. The computing systems can be located downhole, proximate the wellsite, or a distance from the wellsite, such as in a data center, cloud environment, or corporate location. For purposes of this discussion, the example shown in FIG. 2 will be discussed in terms of the wellsite controller 107 alone and located at the wellsite. The wellsite controller 107 can include a processor 204, a memory 207, and a bus 206. The processor 204 can execute one or more operations for automatically controlling the drilling operation using instructions stored in the memory 207 to perform the operations. The processor 204 can include one processing device or multiple processing devices or cores. Non-limiting examples of the processor 204 include a Field-Programmable Gate Array ("FPGA"), an application-specific integrated circuit ("ASIC"), a microprocessor, etc. The system 200 can be implemented as an application, a code library, a dynamic link library, a function, a module, other software implementation, or combinations thereof. In one or more embodiments, the system 200 can be implemented in hardware, such as a ROM, a graphics processing unit, or other hardware implementation. In one or more embodiments, the system 200 can be implemented partially as a software application and partially as a hardware implementation.

The processor 204 can be communicatively coupled to the memory 207 via the bus 206. The non-volatile memory 207 may include any type of memory device that retains stored information when powered off. Non-limiting examples of the memory 207 include EEPROM, flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

In some examples, the memory 207 can include computer program instructions 210 for automatically controlling a drilling operation in part by using input data from the sensor 109. The input data from the sensor 109 may be real-time data related to the borehole 118 and related to values of drilling parameters. The instructions 210, when executed, may cause the processor 204 to calculate drilling parameters and to output the drilling parameters for the drilling operation that satisfy the objective function. The wellbore-drilling parameters can be stored as historical data 212 for later use.

The system 200 can include a power source 220. The power source 220 can be in electrical communication with the wellsite controller 107 and the communications device 244. In some examples, the power source 220 can include a battery or an electrical cable (e.g., a wireline). The power source 220 can include an AC signal generator. The wellsite controller 107 can operate the power source 220 to apply a transmission signal to the antenna 228 to forward data relating to drilling parameters, drilling objectives, drilling operation results, etc. to other systems. For example, the wellsite controller 107 can cause the power source 220 to apply a voltage with a frequency within a specific frequency range to the antenna 228. This can cause the antenna 228 to generate a wireless transmission. In other examples, the wellsite controller 107, rather than the power source 220, can apply the transmission signal to the antenna 228 for generating the wireless transmission.

In some examples, part of the communications device 244 can be implemented in software. For example, the communications device 244 can include additional instructions stored in memory 207 for controlling functions of the communication device 244. The communications device 244 can receive signals from remote devices and transmit data to remote devices. For example, the communications device 244 can transmit wireless communications that are modulated by data via the antenna 228. In some examples, the communications device 244 can receive signals (e.g., associated with data to be transmitted) from the processor 204 and amplify, filter, modulate, frequency shift, and otherwise manipulate the signals. In some examples, the communications device 244 can transmit the manipulated signals to the antenna 228. The antenna 228 can receive the manipulated signals and responsively generate wireless communications that carry the data.

The computing system 200 can receive input from sensor(s) 109. The computing system 200 in this example also includes input/output interface 232. Input/output interface 232 can connect to a keyboard, pointing device, display, and other computer input/output devices. An operator may provide input using the input/output interface 232. Values of drilling parameters or other data related to the operation of the system 100 can also be displayed to an operator through a display that is connected to or is part of input/output interface 232. The displayed values can provide an advisory function to a drill operator who can make adjustments based on the displayed values. Alternatively, the instructions 210 can exercise real-time control over the drilling operation through input/output interface 232, automatically altering operational parameters based on updated well engineering models, changing conditions in the subterranean formation 102 or borehole 118, or the like.

Figure 3:
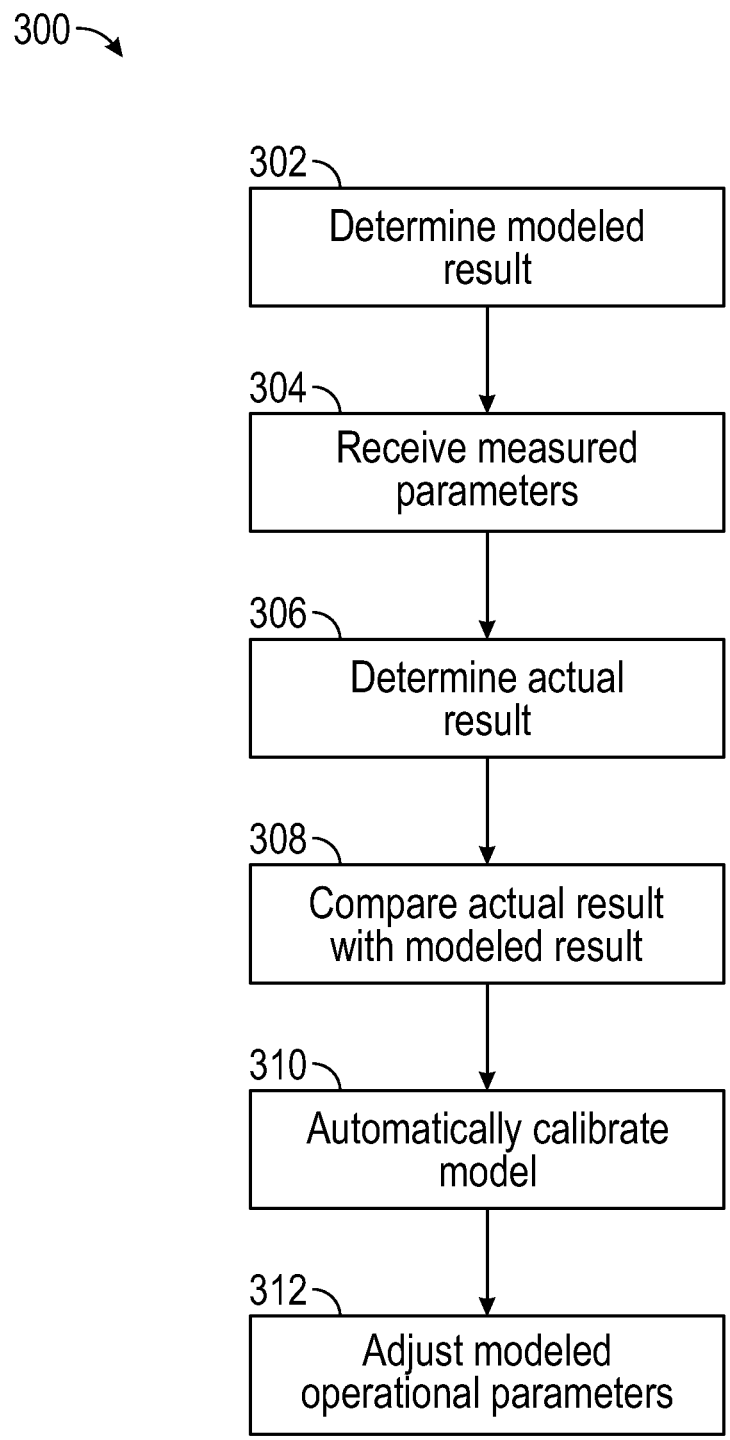
FIG. 3 is a flow diagram of a process calibrating a wellbore engineering model to provide operational parameters for performing a wellbore operation according to one or more embodiments.

FIG. 3 is a flowchart of a process 300 to output a command to automatically control drilling equipment in a drilling operation according to one example of the present disclosure. At block 302, a controller, such as controller 107, is used to determine a modeled result for a borehole drilling operation by inputting modeled operational parameters into a well engineering model. The well engineering model may be any well engineering model used to model the drilling operation. The well engineering model may be a model for an individual operational parameter or may also be a monolithic well engineering model made up of more than one individual operational parameter model. Example operational parameters include friction, excitation, damping, fluid density, fluid composition, hole cleaning, face torque/axial load, packoff plug properties, drill bit properties, swab and surge, casing wear, BHA dynamics, weight on bit ("WOB"), and revolutions per minute. However, other operational parameters may also be used. Other operational parameters can include whether to perform additional processes as part of the drilling operation, such as borehole cleaning.

The initial values for the modeled operational parameters may be set by a user based on the initial planned operational parameters for the drilling operation. The initial modeled operational parameters may be based on initial understandings of the well architecture, the equipment being used, prior experience with similar wells, etc. The initial modeled parameters are input into the well engineering model to produce the modeled result. The modeled result depends on the specific well engineering model or models being used and may include, for example, rate of penetration ("ROP") of the drill bit through the formation. The modeled result may be adjusted by changing the modeled parameters such that the modeled result satisfies an objective function for the well. For example, an objective function for the well may include a determination of the objective desired for the drilling operation. The objective function takes into consideration such factors as ROP and cost of equipment and determines whether the objective for the well is being achieved. If the initial modeled result does not satisfy the objective function, the modeled operational parameter or parameters may be adjusted until the modeled result satisfies the objective function and is optimized. As one example, the operational parameters may be adjusted using Markov chain Monte Carlo ("MCMC") simulations to optimize for the best objective function value.

At block 304, a bottom hole assembly ("BHA") comprising a drill bit is used to perform the borehole drilling operation using the modeled operational parameters. During the drilling operation, a sensor or sensors downhole in the borehole measure actual operational parameters in real-time or near real-time. Such sensors may be any suitable downhole or surface sensors, such as accelerometers, inclinometers, magnetometers, gyroscopes, fluid density meters, etc. The measured actual operational parameter or parameters are then communicated to and received by the controller from the sensor or sensors. Such communication can be through a wired connection or by wireless communication using such wireless communication methods discussed in this disclosure.

At block 306, the controller determines an actual result for the borehole drilling operation by inputting the measured actual operational parameters into the well engineering model or models that were previously used with the modeled operational parameters. At block 308, the controller compares the actual result with the modeled result to determine if there is a difference between the two.

At block 310, if enough of a difference exists between the actual result and the modeled result, the controller automatically calibrates the well engineering model. To do so, the controller analyzes the modeled result and the actual result to determine a coefficient or calibration factor for the operational parameter in the well engineering model. The relationship between the modeled result and the actual result are related according to:

$$f(x) = f(y) + \epsilon(x) + \delta(x) \quad \text{(Eq. 1)}$$

Where:
f(x) is the modeled result;
f(y) is the actual result;
$\epsilon(x)$ is an adjusted value due to the variation and unknown influence of operational parameters that are not considered in the well engineering model; and
$\delta(x)$ is the numerical representation of uncertainty in the measured operational parameter. The uncertainly $\delta(x)$ can be of different distributions, for example, the distribution may be a normal distribution of the operational parameter for a fixed range of timescale.

The goal is to adjust the components of Eq. 1 such that the modeled result equals the sum of the actual result, the adjusted value, and the uncertainty. To do so, a coefficient or calibration factor is applied to the operational parameter in the well engineering model. The coefficient or the calibration factor for the operational parameter or for each operational parameter is calculated as below using a Nash-Sutcliffe parameter.

$$a_0 = 1 - \sum_{n=1}^{\infty} \frac{|C - A|}{|A - \bar{A}|} \quad \text{(Eq. 2)}$$

Where:

C is the modeled result;

A is the actual result; and

Ã is the mean of the actual result in the time series for the measurements taken by the sensor or sensors. The values of the calibration factor do at each measurement n that are greater than zero illustrate a better prediction of the mean of the actual result. The calibration factor $a_0$ is then included in the well engineering model to produce a calibrated well engineering model. Additionally, this calibration method may be used to check the data quality and remove the unwanted outliers of measured actual operational parameters in an automated manner. The method uses an iterative approach of automatically adjusting the operational parameters in realtime by using a reweighted least squares methodology. Alternatively or in addition, the automated calibration may be performed using optimization techniques based on genetic or swarming algorithms, machine learning, deep learning, and Bayesian methods. In particular, Bayesian methods have a unique advantage when the model inputs have high sensitivity and high uncertainty with limited amount of data.

At block 312, the controller determines the modeled operational parameters based on the calibrated well engineering model so as to satisfy the objective function. If, using the adjusted modeled operational parameters, the objective function is not yet satisfied, an optimization algorithm may be run to either further adjust the calibration factor(s) or the modeled operational parameters until the objective function is not only satisfied but optimized. Such parameter adjustment may be done, for example, using machine learning, such as using a neural network. For example, to train a neural network, a computing device that includes the neural network can receive historical data about previous well engineering models, operational parameters, calibration factors, objective functions, and previous measured actual operational parameters. The computing system can use the historical data in combination with at least one objective function to train the neural network to adjust the calibration factor or operational parameter to optimize the objective function. The controller then outputs commands to the drilling system to adjust (or not adjust) the modeled operational parameters and continue performing the drilling operation using the adjusted operational parameters. The process as shown in blocks 302-312 may be repeated at regular intervals or as needed depending on the drilling operation being performed so that the wellbore engineering model or models may continue to be calibrated based on measured actual operational parameters during the operation.

The decision on when to perform the determination of the actual result at block 306 and the comparison at block may be made by a user or automated and implemented by the controller. One example of criteria to be considered is whether enough measurements have been made by the sensor(s) to be able to calculate a meaningful calibration factor. For instance, multiple operational sequences within the drilling operation may be performed before determining an actual result. Additionally, if Eq. 1 is not balancing after the calibration or if the modeled result is diverging from the actual result, the calibration of the model at block 310 may not take place and instead additional measurements may be taken to improve the calibration process. Other criteria may also be used to establish a condition that must be met before the model is calibrated.

Alternatively, under certain circumstances where the comparison of the modeled result to the actual result is larger than a certain threshold, the process may include refining the wellbore engineering model itself rather than just calibrating the model. The model may be refined by taking into account additional, or perhaps fewer, factors that may affect the modeled result. Other refinements may be made to the well engineering model as suitable for the particular well engineering model. Such model refinement may also be done using machine learning, such as using a neural network. For example, to train a neural network, a computing device that includes the neural network can receive historical data about previous well engineering models, operational parameters, objective functions, and previous measured actual operational parameters. The computing system can use the historical data in combination with at least one objective function to train the neural network to develop a well engineering model to output used to determine modeled operational parameters that produce a modeled result.

Additionally or alternatively, in comparing the actual result to the modeled result, the controller may output a warning to an operator of the drilling operation. The operator may receive the warning on an input/output display, for example the input/output interface 232 of FIG. 2. In response to viewing the warning, the operator may choose to update drilling parameters of the drilling operation manually with operational parameter values.

Optimization workflows discussed above can be performed such that they can receive data from borehole sensors, such as downhole sensors, uphole sensors, or surface sensors, and then can proceed to analyze the data using one or more well engineering models. The optimization workflows can proceed to communicate the output to a borehole operation optimizer to output real-time or near real-time adjustments for the borehole operational parameters, for example, an adjustment to a rotational speed, a flow rate, a pressure, a speed of a longitudinal drill string movement, a fluid composition, and other types of adjustments. Therefore borehole operation efficiency can be improved.

In one or more embodiments, the processes and methods can be conducted in real-time or near real-time to adjust the drilling operational parameters or the borehole operation. In drilling operations, operational parameters may be adjusted periodically in the drilling system, such as in discrete intervals, in response to changing conditions in the borehole or the subterranean formation.

Examples of the above embodiments include:

Example 1 is a system for drilling a borehole at a wellsite, comprising a bottom hole assembly ("BHA") comprising a drill bit operable to drill the borehole as part of a borehole drilling operation using a modeled operational parameter. The system also comprises a sensor located in the borehole and operable to measure an actual operational parameter in real-time. The system also comprises a controller comprising a processor and a non-transitory computer-readable medium comprising instructions that a executable by the processor to cause the processor to perform operations. The operations comprise determining a modeled result for the borehole drilling operation by inputting the modeled operational parameter into a well engineering model. The operations also comprise receiving the measurement of the actual operational parameter from the sensor. The operations also comprise determining an actual result for the borehole drilling operation by inputting the measurement of the actual operational parameter into the well engineering model. The operations also comprise automatically calibrating the well engineering model using the modeled result and the actual result to produce a calibrated well engineering model. The operations also comprise adjusting the modeled operational parameter of the drilling operation based on the calibrated well engineering model.

In Example 2, the embodiments of any preceding paragraph or combination thereof further include, wherein the operational parameter comprise at least one or more of friction, excitation, damping, fluid density, hole cleaning, face torque/axial load, packoff plug properties, drill bit properties, swab and surge, casing wear, BHA dynamics, weight on bit, or revolutions per minute.

In Example 3, the embodiments of any preceding paragraph or combination thereof further include, wherein automatically calibrating the well engineering model further comprises automatically calibrating using at least one of an adjusted value due to operational parameters not considered in the well engineering model or an uncertainty value.

In Example 4, the embodiments of any preceding paragraph or combination thereof further include, wherein automatically calibrating the well engineering model is performed using machine learning.

In Example 5, the embodiments of any preceding paragraph or combination thereof further include: more than one sensor operable to measure more than one actual operational parameter; and wherein the drilling operation uses more than one modeled operational parameter and determining the modeled result comprises inputting the modeled operational parameters into one or more well engineering models.

In Example 6, the embodiments of any preceding paragraph or combination thereof further include, wherein the sensor is operable to take multiple measurements of the actual operational parameter over a time interval and wherein automatically calibrating the well engineering model comprises using modeled results and actual results during the time interval.

In Example 7, the embodiments of any preceding paragraph or combination thereof further include, wherein the controller is located at the wellsite.

Example 8 includes a method comprising: determining, using a controller comprising a processor, a modeled result for a borehole drilling operation by inputting modeled operational parameters into a well engineering model; drilling a borehole using a bottom hole assembly ("BHA") comprising a drill bit to perform the borehole drilling operation using the modeled operational parameters; measuring actual operational parameters in real-time with sensors located in the borehole; receiving, by the controller, the measurements of the actual operational parameters from the sensors; determining, using the controller, an actual result for the borehole drilling operation by inputting the measurements of the actual operational parameters into the well engineering model; automatically calibrating, using the controller, the well engineering model using the modeled result and the actual result to produce a calibrated well engineering model; and drilling the borehole to perform the drilling operation, using adjusted modeled operational parameters determined based on the calibrated well engineering model.

In Example 9, the embodiments of any preceding paragraph or combination thereof further include, wherein the operational parameters comprise one or more of friction, excitation, damping, fluid density, hole cleaning, face torque/axial load, packoff plug properties, drill bit properties, swab and surge, casing wear, BHA dynamics, weight on bit, or revolutions per minute.

In Example 10, the embodiments of any preceding paragraph or combination thereof further include: measuring the actual operational parameters after the drilling operation is performed using the adjusted modeled operational parameters; automatically calibrating the well engineering model again using the additional measurements of the actual operational parameters after the drilling operation is performed using the adjusted modeled operational parameters; and drilling the borehole to perform the drilling operation, using adjusted modeled operational parameters determined based on the again calibrated well engineering model.

In Example 11, the embodiments of any preceding paragraph or combination thereof further include, wherein automatically calibrating the well engineering model further comprises automatically calibrating using at least one of an adjusted value due to operational parameters not considered in the well engineering model or an uncertainty value.

In Example 12, the embodiments of any preceding paragraph or combination thereof further include automatically calibrating the well engineering model using machine learning.

In Example 13, the embodiments of any preceding paragraph or combination thereof further include: measuring the actual operational parameter multiple times over a time interval; and automatically calibrating the well engineering model further comprises using modeled results and actual results during the time interval.

In Example 14, the embodiments of any preceding paragraph or combination thereof further include determining the adjusted modeled operational parameters using the calibrated well engineering model to produce a modeled result that satisfies an objective function.

Example 15 includes a non-transitory computer-readable medium comprising instructions that are executable by a processor for causing the processor to perform operations comprising: determining a modeled result for a borehole drilling operation by inputting modeled operational parameters into a well engineering model; receiving real-time measured actual operational parameters of the borehole drilling operation; determining an actual result for the borehole drilling operation by inputting the measurements of the actual operational parameters into the well engineering model; comparing the modeled result to the actual result; automatically calibrating the well engineering model using the modeled result and the actual result to produce a calibrated well engineering model; and outputting a command to adjust the modeled operational parameters of the drilling operation based on the calibrated well engineering model.

In Example 16, the embodiments of any preceding paragraph or combination thereof further include, wherein the operational parameters comprise one or more of friction, excitation, damping, fluid density, hole cleaning, face torque/axial load, packoff plug properties, drill bit properties, swab and surge, casing wear, BHA dynamics, weight on bit, or revolutions per minute.

In Example 17, the embodiments of any preceding paragraph or combination thereof further include, wherein the operations further comprise: receiving real-time measured actual operational parameters of the borehole drilling operation after outputting the command to adjust modeled operational parameters; and automatically calibrating the well engineering model again using the additional measurements of the actual operational parameters.

In Example 18, the embodiments of any preceding paragraph or combination thereof further include, wherein automatically calibrating the well engineering model further comprises automatically calibrating using at least one of an adjusted value due to operational parameters not considered in the well engineering model or an uncertainty value.

In Example 19, the embodiments of any preceding paragraph or combination thereof further include: receiving the real-time measured actual operational parameters multiple times over a time interval; and automatically calibrating the well engineering model further comprises using modeled results and actual results during the time interval.

In Example 20, the embodiments of any preceding paragraph or combination thereof further include determining the adjusted modeled operational parameters using the calibrated well engineering model to produce a modeled result that satisfies an objective function.

Certain terms are used throughout the description and claims to refer to particular features or components. As one skilled in the art will appreciate, different persons may refer to the same feature or component by different names. This document does not intend to distinguish between components or features that differ in name but not function.

For the embodiments and examples above, a non-transitory computer readable medium can comprise instructions stored thereon, which, when performed by a machine, cause the machine to perform operations, the operations comprising one or more features similar or identical to features of methods and techniques described above. The physical structures of such instructions may be operated on by one or more processors. A system to implement the described algorithm may also include an electronic apparatus and a communications unit. The system may also include a bus, where the bus provides electrical conductivity among the components of the system. The bus can include an address bus, a data bus, and a control bus, each independently configured. The bus can also use common conductive lines for providing one or more of address, data, or control, the use of which can be regulated by the one or more processors. The bus can be configured such that the components of the system can be distributed. The bus may also be arranged as part of a communication network allowing communication with control sites situated remotely from system.

In various embodiments of the system, peripheral devices such as displays, additional storage memory, and/or other control devices that may operate in conjunction with the one or more processors and/or the memory modules. The peripheral devices can be arranged to operate in conjunction with display unit(s) with instructions stored in the memory module to implement the user interface to manage the display of the anomalies. Such a user interface can be operated in conjunction with the communications unit and the bus. Various components of the system can be integrated such that processing identical to or similar to the processing schemes discussed with respect to various embodiments herein can be performed.

While descriptions herein may relate to "comprising" various components or steps, the descriptions can also "consist essentially of" or "consist of" the various components and steps.

Unless otherwise indicated, all numbers expressing quantities are to be understood as being modified in all instances by the term "about" or "approximately". Accordingly, unless indicated to the contrary, the numerical parameters are approximations that may vary depending upon the desired properties of the present disclosure. As used herein, "about", "approximately", "substantially", and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus 10% of the particular term and "substantially" and "significantly" will mean plus or minus 5% of the particular term.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A system for drilling a borehole at a wellsite, comprising:
    a bottom hole assembly ("BHA") comprising a drill bit operable to drill the borehole as part of a borehole drilling operation using modeled operational parameters for at least one of the drilling operation or the BHA;
    sensors located in the borehole and operable to measure actual operational parameters in real-time during the borehole drilling operation;
    a controller comprising:
        a processor; and
        a non-transitory computer-readable medium comprising instructions that are executable by the processor to cause the processor to perform operations; and
    wherein, while drilling the borehole, the operations comprise:
        determining a modeled result for the borehole drilling operation by inputting the modeled operational parameters into a well engineering model;
        receiving the measurements of the actual operational parameters from the sensors in real-time during the drilling operation;
        determining an actual result for the borehole drilling operation by inputting the measurements of the actual operational parameters into the well engineering model while the borehole drilling operation is being performed;
        comparing, in real-time, the actual result with the modeled result, and if there is a difference between the actual result and the modeled result, automatically calibrating the well engineering model using the modeled result and the actual result to produce a calibrated well engineering model by analyzing the modeled result, the actual result, and an uncertainty value defined by a numerical representation of uncertainty in the measurable operation parameters for a fixed range of timescale to determine a calibration factor for each measurable operation parameter of the actual operational parameters in the well engineering model, wherein automatically calibrating the well engineering model further comprises applying, in real-time, the calibration factors to each respective measurable operational parameter of the actual operational parameters to produce the calibrated well engineering model;
        adjusting, in real-time, the modeled operational parameters of the drilling operation based on the calibrated well engineering model;
        determining the adjusted modeled operational parameters using the calibrated well engineering model to produce a modeled result that satisfies an objective function;

communicating, in real-time, the adjusted modeled operational parameters to the BHA; and automatically, in real-time, controlling the BHA to perform the borehole drilling operation using the adjusted modeled operational parameters.

2. The system of claim 1, wherein the actual operational parameters comprise at least one or more of friction, excitation, damping, fluid density, cuttings bed height at a specified depth, face torque/axial load, packoff plug thickness, drill bit type and diameter, swab and surge induced pressure change, wear volume at a specified depth on casing, BHA axial force, BHA side force, BHA tool face angle, weight on bit, or revolutions per minute.

3. The system of claim 1, wherein automatically calibrating the well engineering model further comprises automatically calibrating using at least one of an adjusted value due to operational parameters not considered in the well engineering model.

4. The system of claim 1, wherein automatically calibrating the well engineering model is performed using machine learning.

5. The system of claim 1, further comprising
wherein determining the modeled result comprises inputting the modeled operational parameters into more than one well engineering models.

6. The system of claim 1, wherein the sensors are operable to take multiple measurements of the actual operational parameters over a time interval and wherein automatically calibrating the well engineering model comprises using modeled results and actual results during the time interval.

7. The system of claim 1, wherein the controller is located at the wellsite.

8. A method comprising:
determining, using a controller comprising a processor, a modeled result for a borehole drilling operation by inputting modeled operational parameters of at least one of the drilling operation or a bottom hole assembly ("BHA") into a well engineering model;

drilling a borehole using the BHA comprising a drill bit to perform the borehole drilling operation using the modeled operational parameters;

measuring actual operational parameters in real-time during the borehole drilling operation with sensors located in the borehole;

receiving, by the controller, the measurements of the actual operational parameters from the sensors;

determining, using the controller, an actual result for the borehole drilling operation by inputting the measurements of the actual operational parameters into the well engineering model;

comparing, in real-time, the actual result with the modeled result, and automatically calibrating, using the controller, the well engineering model using the modeled result and the actual result to produce a calibrated well engineering model by analyzing the modeled result, the actual result, and an uncertainty value defined by a numerical representation of uncertainty in the measurable operation parameters for a fixed range of timescale to determine a calibration factor for each measurable operation parameter of the actual operational parameters in the well engineering model, wherein automatically calibrating the well engineering model further comprises applying, in real-time, the calibration factors to each respective measurable operational parameter of the actual operational parameters to produce the calibrated well engineering model;

adjusting, in real-time, the modeled operational parameters of the drilling operation based on the calibrated well engineering model;

determining the adjusted modeled operational parameters using the calibrated well engineering model to produce a modeled result that satisfies an objective function;

communicating, in real-time, the adjusted modeled operational parameters to the BHA; and automatically controlling, with the controller in real-time, the BHA to drill the borehole to continue performing the drilling operation using the adjusted modeled operational parameters.

9. The method of claim 8, wherein the actual operational parameters comprise one or more of friction, excitation, damping, fluid density, cuttings bed height at a specified depth, face torque/axial load, packoff plug thickness, drill bit type and diameter, swab and surge induced pressure change, wear volume at a specified depth on casing, BHA axial force, BHA side force, BHA tool face angle, weight on bit, or revolutions per minute.

10. The method of claim 8, further including:
performing additional measurements of the actual operational parameters once the drilling operation is being performed using the adjusted modeled operational parameters;

automatically calibrating the well engineering model again using the additional measurements of the actual operational parameters;

adjusting the modeled operational parameters of the drilling operation again based on the again-calibrated well engineering model;

communicating the again-adjusted modeled operational parameters to the BHA; and automatically controlling, with the controller, the BHA to drill the borehole to continue performing the drilling operation using the again-adjusted modeled operational parameters.

11. The method of claim 8, wherein automatically calibrating the well engineering model further comprises automatically calibrating using at least one of an adjusted value due to operational parameters not considered in the well engineering model.

12. The method of claim 8, further comprising automatically calibrating the well engineering model using machine learning.

13. The method of claim 8, further comprising:
measuring the actual operational parameter multiple times over a time interval; and
automatically calibrating the well engineering model further comprises using modeled results and actual results during the time interval.

14. A non-transitory computer-readable medium comprising instructions that are executable by a processor for causing the processor to perform operations while drilling a borehole comprising:

determining a modeled result for a borehole drilling operation to drill the borehole with a bottom hole assembly ("BHA") by inputting modeled operational parameters into a well engineering model;

receiving real-time measured actual operational parameters of the borehole drilling operation during the borehole drilling operation from sensors located in the borehole;

determining an actual result for the borehole drilling operation by inputting the measurements of the actual operational parameters into the well engineering model while the borehole drilling operation is being performed;

comparing, in real-time, the actual result with the modeled result, and if there is a difference between the actual result and the modeled result, automatically calibrating the well engineering model using the modeled result and the actual result to produce a calibrated well engineering model by analyzing the modeled result, the actual result, and an uncertainty value defined by a numerical representation of uncertainty in the measurable operation parameters for a fixed range of timescale to determine a calibration factor for each measurable operation parameter of the actual operational parameters in the well engineering model, wherein automatically calibrating the well engineering model further comprises applying, in real-time, the calibration factors to each respective measurable operational parameter of the actual operational parameters to produce the calibrated well engineering model;

determining an adjusted modeled operational parameters using the calibrated well engineering model to produce a modeled result that satisfies an objective function;

outputting, in real-time, a command to adjust the borehole drilling operation based on the calibrated well engineering model; and automatically, in real-time, controlling the BHA to perform the borehole drilling operation using the adjusted modeled operational parameters.

15. The non-transitory computer-readable medium of claim 14, wherein the actual operational parameters comprise one or more of friction, excitation, damping, fluid density, cuttings bed height at a specified depth, face torque/axial load, packoff plug thickness, drill bit type and diameter, swab and surge induced pressure change, wear volume at a specified depth on casing, BHA axial force, BHA side force, BHA tool face angle, weight on bit, or revolutions per minute.

16. The non-transitory computer-readable medium of claim 14, wherein the operations further comprise:
receiving real-time measured actual operational parameters of the borehole drilling operation after outputting the command to adjust the drilling operation; and
automatically calibrating the well engineering model again using the additional measurements of the actual operational parameters.

17. The non-transitory computer-readable medium of claim 14, wherein automatically calibrating the well engineering model further comprises automatically calibrating using at least one of an adjusted value due to operational parameters not considered in the well engineering model.

18. The non-transitory computer-readable medium of claim 14, further comprising:
receiving the real-time measured actual operational parameters multiple times over a time interval; and
automatically calibrating the well engineering model further comprises using modeled results and actual results during the time interval.

* * * * *